United States Patent [19]

Leiber

[11] Patent Number: 4,662,687

[45] Date of Patent: May 5, 1987

[54] ANTI-SKID BRAKE SYSTEM AND ANTI-DRIVE-SLIP SYSTEM

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 818,565

[22] Filed: Jan. 13, 1986

[30] Foreign Application Priority Data

Mar. 8, 1985 [DE] Fed. Rep. of Germany ....... 3508319

[51] Int. Cl.$^4$ .............................................. B60T 8/10
[52] U.S. Cl. .................... 303/110; 303/92; 303/114
[58] Field of Search ............ 180/197; 188/181 A; 303/103, 105, 106, 110, 114, 119, 92

[56] References Cited

U.S. PATENT DOCUMENTS 4,565,411 1/1986 Seiber ............................... 303/110

*Primary Examiner*—Duane A. Reger
*Attorney, Agent, or Firm*—Edwin E. Greigg

[57] ABSTRACT

An anti-skid brake system and anti-drive-slip system having a master cylinder, at least one inherently safe closed brake circuit which includes anti-skid valves and wheel brakes, a booster cylinder associated with the master cylinder and in which a booster piston is displaceable, a pressure supply apparatus, a valve connected thereto, which is actuatable by means of a brake pedal for controlling brake pressures. A locking piston cylinder connected to the control valve, a sensing piston, which is coupled to the brake pedal and which passes into the locking piston cylinder, and a change-over valve assembly. This change-over valve assembly is embodied such that for normal braking operation, it connects the booster cylinder with the control valve. If there is a danger of skidding, or wheel lock, this change-over valve assembly disconnects the booster cylinder from the control valve and connects it to a return line in order to relieve pressure and reduce the braking pressure. If drive slip arises, the change-over valve assembly connects the booster cylinder with the pressure supply apparatus.

10 Claims, 1 Drawing Figure

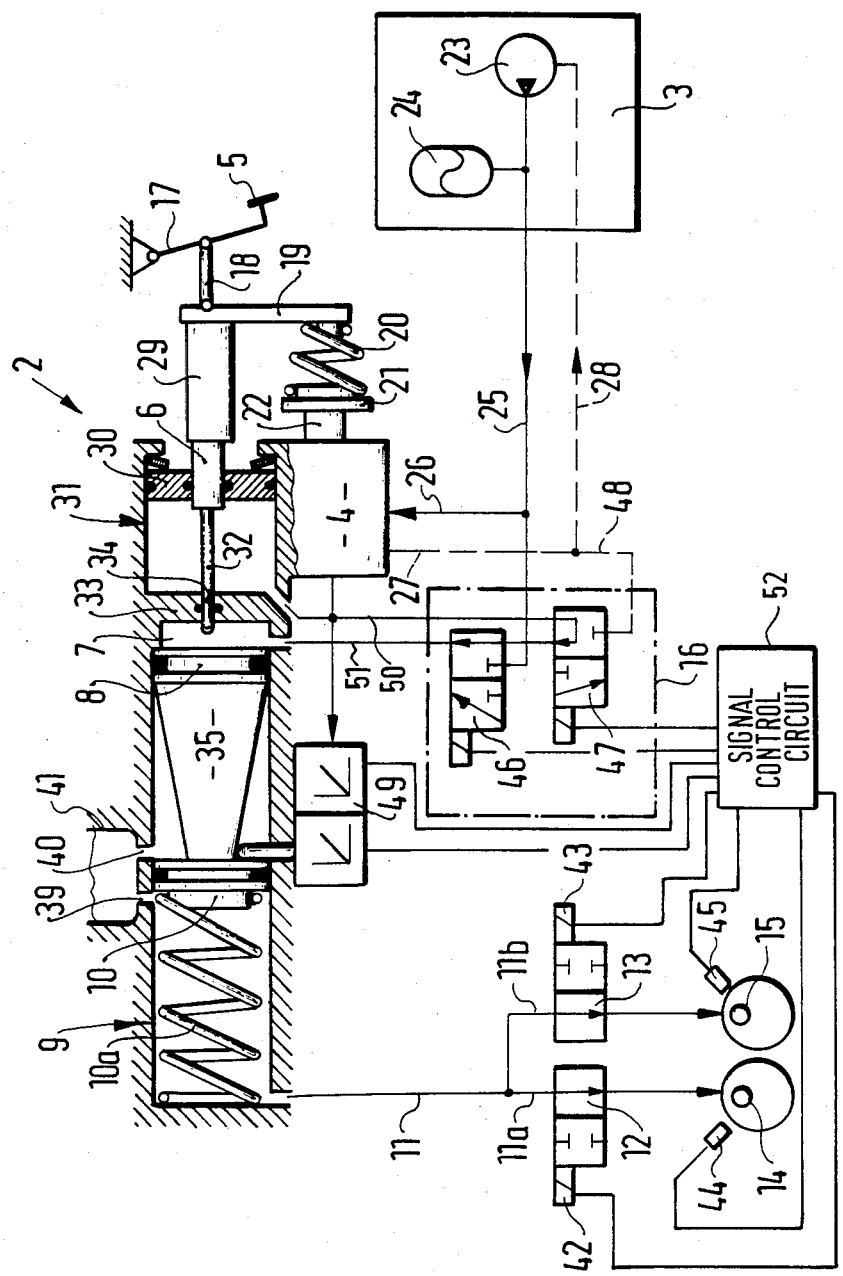

ANTI-SKID BRAKE SYSTEM AND ANTI-DRIVE-SLIP SYSTEM

BACKGROUND OF THE INVENTION

The invention is based on an anti-skid brake system and anti-drive-slip system as generally defined hereinafter. A system of this type known from U.S. Pat. No. 4,589,706, has a pressure supply apparatus; a valve actuated by the brake pedal for controlling brake pressures; a sensing piston coupled with the brake valve for sensing brake pressures controlled by means of the valve; a booster piston, a master cylinder, which is actuatable by the booster piston and to which cylinder brake circuits including anti-skid valves and wheel brakes are connected; and a change-over valve assembly for feeding pressure from the valve that is actuatable by means of the brake pedal into the brake circuits, in order to reestablish brake pressures after brake pressure reductions have been effected in order to lessen the danger of skidding. The change-over valve assembly is additionally embodied such that upon the appearance of undesirable drive slip, pressure medium from the pressure supply apparatus is fed into the brake circuits, bypassing the valve that is actuable by means of the brake pedal. This system has the advantage that only the pressures that are controlled by means of the brake pedal act upon the sensing piston; that is, brake pressures having the purpose of reducing drive slip do not produce any feedback upon the brake pedal. The disadvantage, however, is that all the brake circuits are embodied as so-called openable brake circuits, and for safety reasons expensive monitoring equipment is therefore required. Furthermore, between brake line junctions where feeding is performed and the master cylinder, blocking valves are required, and in the event of anti-drive-slip operation these must be closed. These blocking valves further complicate the system and raise its price.

OBJECT AND SUMMARY OF THE INVENTION

The anti-skid brake system and anti-drive-slip system according to this invention has the advantage over the prior art that at least one brake circuit is closed, and is therefore inherently reliable. This obviates the need for expensive monitoring equipment for the system. Furthermore, like the system known from German patent application No. P 34 01 690.2, the system according to this invention has the advantage that a driver who wants to or has to brake coincidentally during an instance of anti-drive-slip operation will not be irritated by undesirable effects on the sensing piston. As a result, the driver can initiate braking without particular strain and irritation while a vehicle drive motor, for instance one operating at elevated rpm for cold temperatures, is acting on the driving wheels via a torque converter.

The advantages and improvements of the anti-skid brake system and anti-drive-slip system are defined hereinafter. Further developing the system as disclosed hereinafter has the advantage that even if there is a severe drop in braking friction in the wheel brakes, for instance after braking down from maximum speed or driving downhill from a mountain pass, virtually no increase in the brake pedal actuating force is needed. Further characteristics of this invention disclose advantageous exemplary embodiments.

The invention will be better understood and further objects and advantages thereof will become apparent from the ensuing detailed description of a preferred embodiment taken in conjunction with the drawing.

BRIEF DESCRIPTION OF THE DRAWING

The single drawing FIGURE shows an exemplary embodiment of an anti-skid brake system and anti-drive-slip system according to the invention.

DESCRIPTION OF THE PREFERRED EMBODIMENT

The anti-skid brake system and anti-drive-slip system 2 according to the invention has a pressure supply apparatus 3, a control valve 4 for controlling brake pressures, a brake pedal 5, a sensing piston 6, a booster cylinder 7, a booster piston 8, a master cylinder 9 having at least one master cylinder piston 10, at least one closed brake circuit 11 including anti-skid valves 12, 13 and wheel brakes 14, 15, and a change-over valve assembly 16. The master cylinder 9 may also include two master cylinder pistons, in a tandem arrangement known per se and hence not shown here.

The brake pedal 5 is secured to a brake pedal lever 17 and upon a control slide 22, which is a component of valve 4, via the brake pedal lever 17, a link rod 18, an arm 19, a travel simulator spring 20 and a spring plate 21 secured to the end of control slide 22. The valve 4 may by way of example be taken from the generally known prior art, such as The pressure supply apparatus 3 includes a motor (not shown) pump 23 and a pressure reservoir 24, each of which can for instance be taken from the prior art. The valve 4 is supplied with pressure medium by the pressure supply apparatus 3 via lines 25 and 26. Return lines 27 and 28 lead from the valve 4 to the pressure supply apparatus 3. A pedal tappet or rod 29 is secured on the arm 19 substantially in the extension of the link rod 18. The sensing piston 6 is united with the pedal tappet 29 in the pedal tappet extension. The sensing piston 6 has a smaller diameter than the pedal tappet 29 and passes through and is surrounded by a locking piston 30 that is displaceable relative to the sensing piston 6. The locking piston 30 is longitudinally displaceable inside a locking piston cylinder 31. The locking piston cylinder 31 communicates permanently with the valve 4 and together with the locking piston it forms a pressure imposition chamber for the sensing piston 6. An emergency brake tappet 32, which can plunge into the booster cylinder 7 and faces in the opposite direction from the booster piston 8 extends from the sensing piston 6. The booster cylinder 7 is located in axial alignment with the locking piston cylinder 31, from which it is divided by a wall 33, in which there is an opening 34 through which the emergency brake tappet or rod 32 is inserted and is free to move relative to the wall 33. An O-ring prevents fluid leakage between the extension 32 and the opening 34.

The master cylinder 9 is oriented in axial alignment with the booster cylinder 7 in the housing extension thereof and receives therein the master cylinder piston 10 and a restoring spring 10a. The master cylinder piston 10 and the booster piston 8 are connected with one another via a conical shaped piston rod 35. The master cylinder 9 has a relief bore 39 and a refill bore 40 and communicates via these bores with a refill container 41.

The brake circuit 11 is embodied as a closed brake circuit having branches 11a and 11b and is connected to the master cylinder 9. The anti-skid valves 12 and 13 incorporated into the brake circuit branches 11a and 11b are embodied as electromagnetically controllable 2/2-way valves and are open in their normal positions during normal braking. With the aid of electromagnets 42 and 43 these anti-skid valves 12 and 13 can be controlled as needed to assume blocking positions. The wheel brakes 14 and 15 are connected to the anti-skid valves 12 and 13 and are embodied as disk or drum brakes in a known manner. Wheel rotation sensors 44, 45, which can also be taken from the prior art, are associated with the wheel brakes 14 and 15.

The change-over valve assembly 16 includes a first electromagnetically controllable 3/2-way valve 46 and an electromagnetically controllable 3/2-way valve 47. In its basic position, the 3/2-way valve 47 connects the valve 4 with the 3/2-way valve 46. In a switching position for decreasing braking pressure, the 3/2-way valve 47 connects the 3/2-way valve 46 with the return line 28 via a return line 48. The 3/2-way valve 46, in its basic position, connects fluid from the 3/2-way valve 47 with the booster cylinder 7. In a further position, a so-called switching position for anti-slip operation, the 3/2-way valve 46 connects the booster cylinder 7 with the pressure supply apparatus 3 and the booster cylinder 7 is disconnected from the valve 4 and the locking piston cylinder 31. In addition to the 3/2-way valve 47 and the locking piston cylinder 31, a pressure sensor 49 is also connected to the valve 4.

Mode of Operation

If the brake pedal 5 is not actuated, it is pressed into or retained in its initial position by the travel simulator spring 20. The restoring spring 10a pushes the master cylinder piston 10 and the booster piston 8 into an initial position in the direction of the emergency brake tappet 32 and the brake pedal. In this outset position, as already indicated, the refill container 41 communicates with the brake circuit 11 via the relief bore 39 and the master cylinder 9. The refill bore 40 is also open, so that one side of the master cylinder piston 10, adjoining the piston rod 35, is also supplied with pressure medium from the refill container 41.

If the brake pedal 5 is actuated while the pressure supply apparatus 3 is out of operation, then via the brake pedal lever 17, the link rod 18, the pedal tappet or rod 29 and the sensing piston 6, the emergency brake tappet or rod 32 is passed more deeply into the booster cylinder 7, thereupon contracting the booster piston 8 and displacing the booster piston in the direction of the master cylinder 9. As a result, the master cylinder piston 10 is displaced, so that the piston 10 moves to cover the relief bore 39 and builds up brake pressure in chamber 9, which is fed into the wheel brakes 14 and 15 through the brake circuit branches 11a and 11b and through the normally open anti-skid valves 12 and 13. If the brake pedal 5 is released, then the result is that both the pedal and the master cylinder piston 10 return to their initial positions, which have already been described and the brakes on the wheels will be released.

If the pressure supply apparatus 3 is in operation and is furnishing sufficient pressure, and the control slide 20 is displaced via the travel simulator spring 20 by the actuation of the brake pedal 5, then partial quantities of pressure medium that have been kept in readiness by the pressure supply apparatus 3 flow through valve 4 into the pressure sensor 49, locking cylinder 31 and also, through the two 3/2-way valves 47 and 46, into the booster cylinder 7 via lines 50 and 51. This causes a pressure rise in the booster cylinder 7, which is imposed on the booster piston 8. As a result of this pressure, the booster piston 8 will displace the master cylinder 10 beyond the relief bore 39, thereby generating brake pressures in the brake circuit branches 11a and 11b. Releasing the brake pedal 5 causes a release of control valve 4 which causes the booster cylinder 7, the locking piston cylinder 31 and the pressure sensor 49 to be relieved of pressure, causing brake pressures in the brake circuit branches 11a and 11b to decrease.

If, during a braking operation when the pressure supply apparatus 3 is furnishing adequate pressure and boosted braking is accordingly taking place, the brake pressure in one of the two wheel brakes 14 or 15 or even in both wheel brakes is increased to such an extent that there is a danger of skidding, or wheel locking, signals from sensors 44 and 45 indicate the state of rotation of the wheels and direct signals into a well known control circuit 52 shown in block form and a signal is directed to the 3/2-way valve 47, then the 3/2-way valve 47 is directed into its pressure reduction position, which relieves the pressure in booster cylinder 7. As a result, as already indicated, the booster cylinder 7 is disconnected from the valve 4 and connected to the return line 48 via 3/2-way valve 47. As a result, the pressure in the booster cylinder 7 decreases, and both the booster piston 8 and the master cylinder piston 10 can travel in the direction of their initial positions, causing the brake pressure to decrease. If the situation is such that both wheel brakes 14 and 15 are bringing about a danger of skidding, which can be detected by means of the wheel rotation sensors 44 and 45 and a control signal is directed to 3/2-way valve 47, then both anti-skid valves 12 and 13 remain open, so that the brake pressures in both wheel brakes 14 and 15 decrease as set forth above. Contrarily, if only one of the two wheel brakes 14 or 15 is generating excessive braking forces, then one of the two anti-skid valves 12, 13 is kept open and a signal is directed to the other one to close the valve for the wheel that is not skidding and also to valve 47. The anti-skid valve that stays open is the one for the wheel brake that is producing the danger of skidding. The anti-skid valve of the other wheel brake, which is not producing a danger of skidding, is closed; thus in that wheel brake, the brake pressure is maintained. Once the danger of skidding has been overcome, then the 3/2-way valve 47 is directed back into its basic position, so that by means of pressure from the valve 4 controlled by the brake pedal 5, braking pressures are once again built up in the brake circuit branches 11a and 11b, via the booster piston 8. If the danger of skidding arises once again, then the 3/2-way valve 47 is returned to its position for reducing brake pressure in the main pressure line and the wheel not skidding will be controlled to apply brakes to that wheel only as set forth above.

If wheels, not shown but associated with the wheel brakes 14 and 15 and located for instance on an icy road surface, are driven by a driving motor, not shown and which for instance operates with an elevated rpm for cold idling, in such a way that drive slip arises for instance at both wheels, then this drive slip is likewise recognized via the wheel rotation sensors 44 and 45. If drive slip is occurring, then signals are directed to the 3/2-way valve 46 which changes the valve out of its basic position into its control position. As a result, this 3/2-way valve 46 disconnects the booster cylinder 7 from the valve 4 and connects the booster cylinder 7 to the pressure supply apparatus 3 via lines 25 and 51. Pressure medium consequently flows out of the pressure supply apparatus 3 into the booster cylinder 7, and via the booster piston 8 effects brake pressures in the brake circuit branches 11a and 11b and their wheel brakes 14 and 15, which reduce disadvantageously high drive torques at the driven wheels without application of brake pedal 5. If the reduction has progressed far enough that undesirable drive slip is at least largely overcome, then the 3/2-way valve 46 is directed back into its basic position. The result is that the booster cylinder 7 is then connected to the other 3/2-way valve 47. As a result, the booster cylinder 7 is relieved of pressure through the valve 4 via line 50 and the return lines 27 and 28. As already noted in the case of anti-skid braking operation, the above-described control process can be repeated. If drive slip arises at only one of the driven wheels, then with the aid of one of the anti-skid valves 12 or 13 it is assured that brake pressure becomes operative only in the particular wheel brake 14 or 15 associated with the wheel at which the drive slip occurs.

Because the sensor 49 is a pressure sensor the pressure indication which is dependent on the force with which the brake pedal 5 is actuated, is measured indirectly. As already explained, the wheel rotation sensors 44 and 45 serve to monitor wheel rotations per minute. A circuit known per se and therefore shown in block form is used for this purpose. This circuit indicates, among others, the speed and also the braking deceleration of the vehicle in which the described anti-skid brake system and anti-drive-slip system 2 is installed. In a control circuit, shown in block form, the braking decelerations are compared continuously with pressure indications from the pressure sensor 49. If the comparisons indicate, for instance, that the braking decelerations are lessening while the actuation force of the brake pedal 5 is staying the same, or that while the braking decelerations are remaining the same, ever higher forces are needed to actuate the brake pedal 5, which normally occurs from a loss of friction at the brake linings due to heating, then this control circuit becomes operative. The control circuit controls the change-over valve assembly 16 in such a way that in accordance with the loss of friction, the pressure rises to a higher level in the booster cylinder 7 than in the locking piston cylinder 31 which acts upon the sensing piston 6 that exerts feedback upon the brake pedal 5. In so doing, as in the anti-drive-slip instance, pressure medium is sent by the change-over valve assembly 16 from the pressure supply apparatus 3 into the booster cylinder 7, bypassing the valve 4. Because the changeover valve assembly 16 is necessary in any case in order to reduce drive slip, it is possible to additionally equip an anti-skid brake system and anti-drive-slip system with a means for automatic friction loss compensation at only a little added expense for the control circuit. Thus, this further provision means that if there is a loss of friction, the system 2 operates as a braking deceleration regulator. The set-point value for a desired braking deceleration is predetermined by means of the brake pedal 5. Naturally other known means for measuring forces acting upon the brake pedal 5 can be used instead of the pressure sensor 49. Similarly, the wheel rotation sensors 44 and 45 and an evaluation circuit which in a known manner contains at least one differentiator can be replaced by a seismic mass which is associated with elastic suspension means and a measured value transducer.

It is also noted that the order of the 3/2-way valves 46 and 47, as viewed from the booster cylinder 7, can be reversed. Also, these 3/2-way valves 46 and 47 can for instance be replaced by a 4/3-way or 4/4-way valve, not shown.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An anti-skid brake system and anti-drive-slip system which comprises a brake pedal, a pressure supply apparatus (3), a fluid control valve (4) connected to said pressure supply apparatus which is actuatable by means of said brake pedal in order to control brake pressures, a sensing piston (6) movable by said pedal which is acted upon by pressures from said valve, at least one booster cylinder (7) and one booster piston (8) in said booster cylinder for actuating a master cylinder piston (10) in a master cylinder, at least one brake circuit connected to the master cylinder, said brake circuit including anti-skid valves (12,13) and wheel brakes, a change-over valve assembly (16) for generating brake pressures in at least one of the brake circuits, said change-over valve assembly includes first and second electrically controllable valves (46,47) adopted to receive fluid pressures from said control valve (4) and from said pressure supply apparatus (3), a locking piston cylinder (31) which receives said sensing piston (6) that is separate from said booster cylinder (7) and said locking piston cylinder is continuously connected to said control valve that is controllable by the brake pedal, said first and second electrically controlled valves are embodied such that in their basic position, fluid is connected from said control valve to said booster cylinder via said electrically controlled valves and when in another switching position for anti-drive-slip operation said electrically controlled valves disconnect said booster cylinder from said control valve and connect said booster cylinder with the pressure supply apparatus, and in a further switching position said electrically controlled valves relieve said booster cylinder of pressure which is directed into a return line and said at least one brake circuit which in the case of anti-drive-slip operation feeds brake pressures to said wheel brakes which is embodied as a closed brake circuit.

2. A system as defined by claim 1, in which said first electrically controllable valve is embodied as a first 3/2-way valve and is connected with said booster cylinder and said pressure supply apparatus and said second electrically controllable valve is embodied as a 3/2-way valve and is connected with said first 3/2-way valve, said second electrically controllable valve being connected to said control valve and to a return line that is intended for pressure reductions and leads to a return to the pressure supply apparatus.

3. A system as defined by claim 1, which includes a brake pedal force measuring device and a deceleration measuring device and a control circuit connected to said brake pedal force measuring device and to said deceleration measurng device, said control circuit is embodied such that upon actuation of the brake pedal said control circuit monitors brake pedal forces and braking decelerations in order to detect a loss of friction in the wheel brakes, and upon reaching a preselectable threshold said control circuit controls said change-over valve assembly such that the loss of friction is compensated for by feeding pressure from said pressure supply apparatus into the booster cylinder which automatically actuates the brakes.

4. A system as defined by claim 2, which includes a brake pedal force measuring device and a deceleration measuring device and a control circuit connected to said brake pedal force measuring device and to said decelaration measuring device, said control circuit is embodied such that upon actuation of the brake pedal said control circuit monitors brake pedal forces and braking decelerations in order to detect a loss of friction in the wheel brakes, and upon reaching a preselectable threshold said control circuit controls said change-over valve assembly such that the loss of friction is compensated for by feeding pressure from said pressure supply apparatus into the booster cylinder which automatically actuates the brakes.

5. A system as defined by claim 3, in which said brake pedal force measuring device is embodied as a pressure sensor, which is connected to said control valve.

6. A system as defined by claim 4, in which said brake pedal force measuring device is embodied as a pressure sensor, which is connected to said control valve.

7. A system as defined by claim 3, in which said braking deceleration measuring device includes wheel rotation sensors and a circuit that evaluates wheel rotation signals.

8. A system as defined by claim 4, in which said braking deceleration measuring device includes wheel rotation sensors and a circuit that evaluates wheel rotation signals.

9. A system as defined by claim 5, in which said braking deceleration measuring device includes wheel rotation sensors and a circuit that evaluates wheel rotation signals.

10. A system as defined by claim 6, in which said braking deceleration measuring device includes wheel rotation sensors and a circuit that evaluates wheel rotation signals.

* * * * *